Patented May 27, 1941

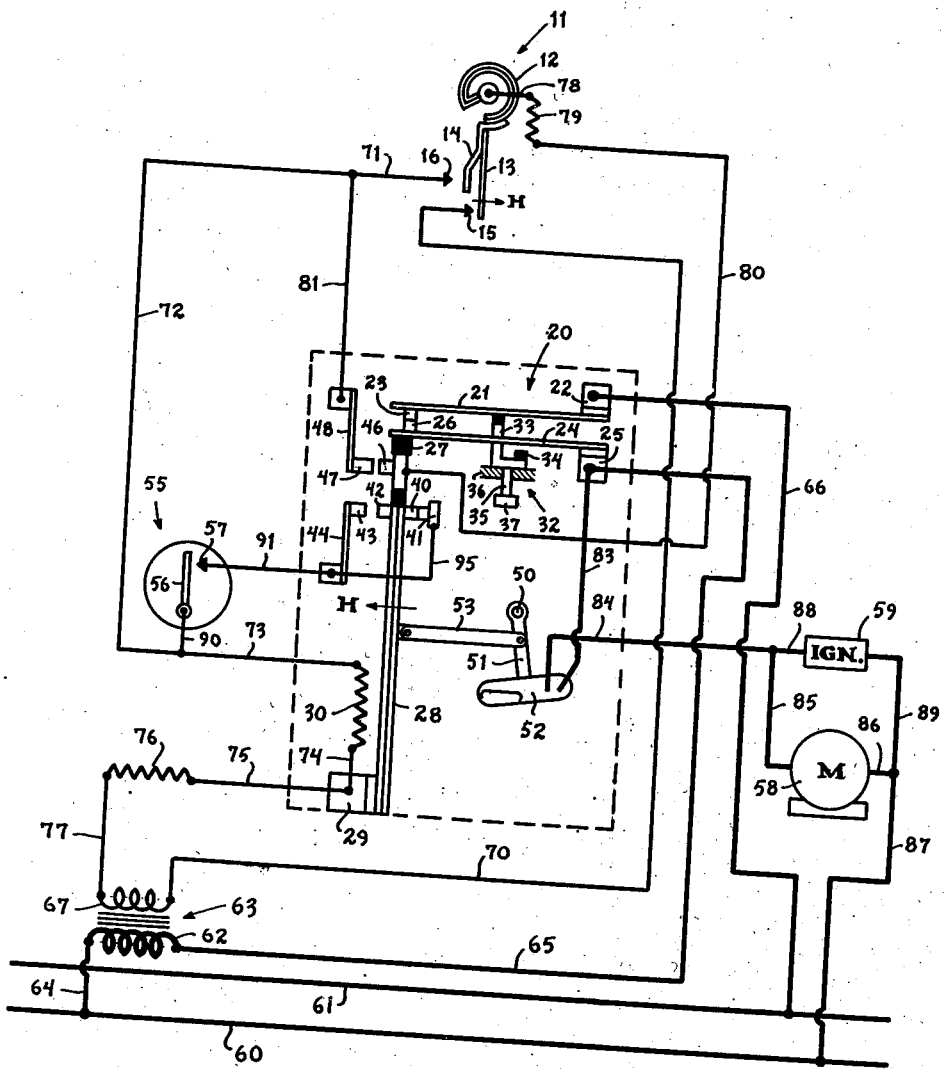

2,243,200

UNITED STATES PATENT OFFICE 2,243,200

CONTROL SYSTEM

George H. Fisher, St. Louis Park, Minn., assignor to Minneapolis-Honeywell Regulator Company, Minneapolis, Minn., a corporation of Delaware Application August 21, 1939, Serial No. 291,171

3 Claims. (Cl. 236—68)

The present invention is directed broadly to a control system for controlling the value of a condition, and more particularly to a system in which a condition responsive element energizes and deenergizes a timer which in turn actuates the control device for the condition to be controlled.

It is one of the objects of the invention to maintain a condition at substantially the desired value by arranging the control system so that when the condition decreases to a value slightly lower than the desired value the condition responsive element will render the control device operative to increase the value of the condition, and a predetermined time after the condition value has risen above the predetermined low value the control device will be rendered inoperative whereby the condition will increase to the desired value and will not rise way above that value. This is accomplished by having the condition responsive element energize a timer to render the control device operative at the predetermined low value of the condition and deenergize the timer to render the control device inoperative when the element responds to a predetermined higher value. When the condition value rises above the predetermined low value an auxiliary control device is energized for causing the condition responsive element to falsely assume the position corresponding to the predetermined higher condition value after a predetermined time, thereby rendering the control device inoperative.

A further object is to apply this control system to a fuel burner system in which the timer controls an electric fuel feeding device and also unlatches a safety switch to lock the system out after a predetermined time interval unless combustion is established first. Such a system is disclosed in the copending application of John M. Wilson Serial No. 253,338 filed January 28, 1939. In the present system the timer also establishes the circuit to the auxiliary control device thereby rendering it capable of energization by the condition responsive device.

The invention will be illustrated and described in connection with a temperature control system in which the condition responsive element is a thermostat, but it will be understood that the present invention may be applied to other control systems such as pressure and humidity, for example. The auxiliary control device need not necessarily affect the condition responsive element by increasing the condition value to which it responds. It may also move the element or its cooperating contacts mechanically, if desired, to produce the same result.

These and other objects will readily become apparent as the following specification is read in the light of the accompanying drawing, the single figure of which diagrammatically illustrates one embodiment of my invention.

Referring now to the drawing, the reference numeral 11 indicates generally a room thermostat which comprises a bimetal coil 12 which is fixed at one end and which carries at its free end a pair of contact blades 13 and 14. The contact blades are so arranged that on a decrease in temperature the blade 13 will first be moved into engagement with the stationary contact 15 and as the temperature continues to decrease the contact blade 14 will be brought into engagement with the stationary contact 16. Blade 13 flexes to permit the blade 14 to engage the contact 16 after the blade 13 has engaged the contact 15.

Indicated generally at 20 is a safety switch comprising a resilient contact blade 21 which is connected at one end to the bracket 22 and carries at its free end a contact 23. The blade 21 is biased downwardly. Resilient contact blade 24 is connected at one end to the bracket 25, carries at its free end a contact 26, and is also biased downwardly. Contacts 23 and 26 are normally held closed by means of the insulating button 27 carried on the free end of the bimetallic timer 28 whose other end is fixed to the bracket 29. In the cold position of the bimetallic timer 28 the button 27 holds contact 26 in engagement with contact 23 but as the timer is heated by means of the electrical heater 30 it warps toward the left and blade 24 will drop off the end of the button 27 after a predetermined period of time and permit the contact 26 to separate from the contact 23. The bimetallic timer 28 upon cooling will be unable to reclose the contacts 26 and 23. They must be manually reclosed by means of the manual reset member indicated at 32. The reset member 32 comprises a long leg 33 and a short leg 34 which are simultaneously moved by means of the stem 35 which is slidably supported in the stationary support 36. The stem 35 is manually raised by means of the knob 37 which first raises the contact blade 21 thereby holding the contact 23 out of the path of movement of the contact 26 and then the short leg 34 raises the contact blade 24 and relatches it on the button 27 providing the bimetallic timer 28 has returned to cold position. The knob 37 is then released at which time contact 23 is permitted to reengage the contact 26.

The movable end of the bimetallic timer 28 also carries a contact 40 which in the cold position of the timer 28 engages the stationary contact 41. Opposite the contact 40 the timer 28 carries the movable contact 42 which is adapted to cooperate with contact 43 mounted upon the resilient blade 44 as the timer warps toward the left as viewed in the drawing. Also carried by the bimetallic timer 28 and insulated with respect thereto is a movable contact 46 which cooperates with contact 47 as the timer warps toward the left. Contact 47 is carried by the resilient blade 48.

Pivoted at 50 is a lever 51 which carries at its free end a mercury switch 52. A link 53 is pivotally connected at one end to the lever 51 and at the other end to the bimetallic timer 28 in such a manner that when the bimetallic timer is in its cold position the link 53 cooperates with the lever 51 to hold the mercury switch 52 in open position and as the timer heats up and warps toward the left the link 53 rotates the lever 51 in a clockwise direction to close the circuit through the mercury switch 52.

Indicated generally at 55 is a combustion responsive device comprising a movable switch arm 56 and a stationary contact 57. The switch arm 56 is adapted to be rotated by means of a combustion responsive device such as a stack thermostat for example. The switch arm 56 is connected with the thermostat by means of a slip friction device so that the switch is actuated on a change in temperature trend and not at any predetermined temperature. It is arranged so that the switch arm 56 engages the stationary contact 57 as combustion is established and separates from the contact 57 on failure of combustion.

Indicated at 58 is the usual burner motor and 59 indicates a means for igniting the fuel delivered to the combustion chamber of the furnace by the burner motor.

The power for energizing the above control system is supplied from the lines 60 and 61 to which the primary 62 of the transformer 63 is connected at one end by means of the conductor 64. The other end of the primary 62 is connected by means of conductor 65, the normally closed safety switch 20 and conductor 66 to the other supply line 61. The secondary winding 67 of the transformer 63 supplies low voltage current for the bimetal timer and room thermostat.

Assuming that the temperature in the zone to be controlled is at or above the desired value the elements of the control system will be in the positions shown in the drawing. It will be noted that at this time the combustion responsive switch 56, 57 is open, the bimetallic timer 28 is in its cold position and therefore holding the burner motor switch 52 open, and the room thermostat 11 is holding both of its switches in open position. On a decrease in room temperature the switch blade 13 will first engage the stationary contact 15. Closure of this switch will not complete an electrical circuit at this time due to the fact that the switch 14, 16 is open and the switch 46, 47 is open. On a continued decrease in room temperature the switch blade 14 will be brought into engagement with the stationary contact 16 at which time the following circuit will be closed: from the secondary winding 67 of the transformer 63 through conductor 70 to contact 15, switch blades 13 and 14, contact 16, conductors 71, 72 and 73, electric heater 30, conductors 74 and 75, protective resistance 76 and conductor 77 back to the other side of the secondary winding 67. This circuit energizes the electric heater 30 causing the bimetallic timer 28 to warp toward the left closing the switch contacts 46 and 47 and also closing the burner motor switch 52.

Closure of the switch contacts 46 and 47 set up a holding circuit around the switch 14, 16 which may be traced as follows: secondary winding 67, conductor 70, contact 15, switch blade 13, bimetallic element 12, conductor 78, auxiliary heater 79, conductor 80, switch contacts 46 and 47, resilient blade 48, conductors 81, 72 and 73, electric heater 30, conductors 74 and 75, protective resistance 76 and conductor 77 back to the other side of the secondary winding 67. It will be noted that the latter circuit includes an auxiliary electric heater 79 located adjacent the bimetallic element 12. This heater will not be energized at this time because the original energizing circuit for the heater 30 is still closed at 14, 16, which circuit shunts out the heater 79.

Closure of the mercury switch 52 energizes the burner 58 and the ignition device 59 by means of the conductor 66 which is connected to supply line 61, the normally closed safety switch 20, conductor 83, mercury switch 52, conductors 84 and 85, burner motor 58 and conductors 86 and 87 back to the supply line 60. The ignition device 59 is connected in parallel with the burner motor 58 by means of the conductors 88 and 89.

As the burner motor and the ignition device are energized combustion will normally be established which will cause the combustion responsive device 55 to move the switch arm 56 into engagement with the stationary contact 57. As the bimetallic timer continues to warp to the left under the influence of the electric heater 30 it will eventually cause the movable contact 42 to engage the stationary contact 43. This will establish a shunt circuit around the electric heater 30 from the conductor 72 through conductor 90, switch arm 56, contact 57, conductor 91, switch blade 44, contacts 43 and 42, bimetallic timer 28 and bracket 29 back to the conductor 75. This shunt circuit will deenergize the heater 30 causing bimetallic timer to cool off, warp to the right, and move the contact 42 out of engagement with the contact 43 thereby breaking the above shunt circuit. This will energize the heater 30 causing the timer to warp to the left again and reclose the shunt circuit. This action will continue, and during all this time the burner motor switch 52 will be held in closed position to maintain combustion within the furnace.

As a result of the combustion produced within the furnace the temperature at the thermostat 11 will begin to increase and the bimetallic element 12 will cause the switch arm 14 to disengage the stationary contact 16. This breaks the original energizing circuit for the electric heater 30 and the circuit for this heater must now pass through the bimetal element 12, the auxiliary heater 79, conductor 80, contacts 46 and 47, resilient blade 48, conductors 81, 72 and 73 and electric heater 30. During this time the bimetallic timer 28 is operative to make and break the contacts 42 and 43 which make and break the shunt circuit around the heater 30. In view of the fact that the energizing circuit for the heater 30 is now passing through the auxiliary heater 79, this heater will be energized with the result that the temperature of the bimetallic element 12 will be increased above that of the surrounding atmosphere and after a predetermined time interval the amount of this increase will be such that the contact blade 13 will be moved out of engagement with the stationary contact 15. It will be noted that when contacts 42 and 43 are open the heater 79 is in series with resistances 30 and 76 and when contacts 42 and 43 are closed heater 79 is in series with resistance 76 only. The current value through heater 79 is therefore not steady, but the heat emitted by the heater has a tendency to average out and produce a practically even and regular effect on the thermostat 12. When this occurs the electric heater 30 will be deenergized and the timer 28 will cool and open switch 46, 47. The heater 30 cannot now be reenergized until the thermostat 12 recloses the original energizing circuit at the switch 14, 16 because the holding circuit has been broken at 46, 47. Cooling of the bimetallic timer 28 also opens mercury switch 52 which shuts down the burner motor and the ignition device.

It will be seen that the original energizing circuit for the heater 30 for the timer 28 passes through the switches 13, 15 and 14, 16 in series and that when the timer heats up it closes the switch 46, 47 establishing a holding circuit for the heater 30 independently of the switch 14, 16 so that this heater cannot be deenergized until the thermostat 14 separates contact blade 13 from the stationary contact 15. Further it will be noted that as the thermostat 12 initially responds to an increase in temperature resulting from the combustion within the furnace it opens the switch 14, 16 which causes the energization of the auxiliary heater 79. This heater raises the temperature of the bimetallic element 12 above that of the surrounding atmosphere to the point where it causes the arm 13 to separate from the stationary contact 15 causing the bimetallic timer 28 to cool off and shut down the burner motor and ignition device. The size of the heater 79 predetermines the length of time required to cause the thermostat 12 to open the switch 13, 15 following the opening of switch 14, 16.

The above description covers the normal operation of the control system. In the event combustion is not established after the bimetallic timer 28 has warped sufficiently to close the switch 52, then the combustion responsive device 55 will not close the switch 56, 57 and as a result the shunt circuit around the heater 30 will not be established when the timer 28 closes the contacts 42, 43. The bimetallic timer 28 will therefore continue to warp toward the left pressing back the blades 44 and 48 and after a predetermined time interval the flexible blade 24 will drop off of the button 27 disengaging the contacts 26 and 23 thereby breaking the circuit to the primary 62 of the transformer 63 and to the burner motor and the ignition device. The parts will remain in this position until they are manually reset as described above. It may be pointed out that the manual reset is of the trip free type. In other words, the switch contacts 26 and 23 cannot be manually held closed by pushing in the button 27 and can be closed only if the bimetallic element 28 is in its cold position.

If combustion should fail for any reason while the system is running the combustion responsive device 55 will open the switch 56, 57 so that the heater 30 will remain continuously energized until the bimetallic timer 28 moves far enough to the left for the contact blade 24 to drop off the button 27 and shut the system down as in the case of ignition failure.

It may be noted that this system has an additional feature of safety. If the combustion responsive contacts 56 and 57 should be stuck in closed position this system will be unable to start up because of a shunt circuit around heater 30. This circuit comprises conductor 90, switch arm 56, contact 57, conductors 91 and 95, contacts 41 and 40, bimetallic element 28 and bracket 29 to conductor 75. This prevents the system from starting when it has no protection for ignition or combustion failure.

As certain changes and modifications of this invention may occur to those who are skilled in the art it is to be understood that I intend to be limited only by the scope of the appended claims and not by the specific embodiment disclosed.

I claim as my invention:

1. In a fuel control device, in combination, an electrically operable fuel supply controlling device, a circuit therefor, an electric timing device, connections by which said timing device, when energized, first closes said circuit and thereafter opens it again, means responsive to combustion conditions cooperating with said timing device to prevent the reopening of said circuit if combustion is established first, a main switch to energize said timing device, an element moving in one direction in response to a condition change to close said main switch, and timing means rendered operative to deenergize said timer a predetermined time after a reversal in movement of said element.

2. In a fuel control device, in combination, an electrically operable fuel supply controlling device, a circuit therefor, an electric timing device, connections by which said timing device, when energized, first closes said circuit and thereafter opens it again, means responsive to combustion conditions cooperating with said timing device to prevent the reopening of said circuit if combustion is established first, a condition responsive element, means controlled by said element as said condition decreases to a first value for energizing said timing device, means controlled by said element as said condition increases to a second higher value for deenergizing said timer, and an activator rendered operative by said condition responsive element as said condition rises above said first value for causing said element to assume a position corresponding to said second condition value whereby said timer is deenergized.

3. In a fuel control device, in combination, an electrically operable fuel supply controlling device, a circuit therefor, an electric timing device, connections by which said timing device, when energized, first closes said circuit and thereafter opens it again, means responsive to combustion conditions cooperating with said timing device to prevent the reopening of said circuit if combustion is established first, a thermal element, a first switch closed by said thermal element at a first temperature, a second switch closed by said thermal element at a second lower temperature, a circuit energizing said timing device including both switches, a third switch closed by said timing device when energized, a local heater for said thermal element, and circuit connections energizing said heater and maintaining said timing device energized when said second switch is open including said first and third switches, said heater causing the temperature of said thermal element to increase to said first value after a predetermined length of time.

GEORGE H. FISHER.